(12) United States Patent
Wan et al.

(10) Patent No.: US 11,747,694 B1
(45) Date of Patent: Sep. 5, 2023

(54) DISPLAY PANEL AND DISPLAY DEVICE

(71) Applicant: HKC Corporation Limited, Guangdong (CN)

(72) Inventors: Ye Wan, Guangdong (CN); Haijiang Yuan, Guangdong (CN)

(73) Assignee: HKC CORPORATION LIMITED, Guangdong (CN)

( * ) Notice: Subject to any disclaimer, the term of this patent is extended or adjusted under 35 U.S.C. 154(b) by 0 days.

(21) Appl. No.: 18/091,660

(22) Filed: Dec. 30, 2022

(30) Foreign Application Priority Data

Apr. 29, 2022 (CN) .......................... 202210466766.3

(51) Int. Cl.
*G02F 1/1335* (2006.01)
*G02F 1/1343* (2006.01)
(Continued)

(52) U.S. Cl.
CPC ........ *G02F 1/13756* (2021.01); *G02F 1/1368* (2013.01); *G02F 1/13439* (2013.01);
(Continued)

(58) Field of Classification Search
CPC ............. G02F 1/1335; G02F 1/133512; G02F 1/133514; G02F 1/133524;
(Continued)

(56) References Cited

U.S. PATENT DOCUMENTS

2015/0340416 A1 11/2015 Qi et al.
2021/0333654 A1* 10/2021 Zhao ................. G02F 1/133512

FOREIGN PATENT DOCUMENTS

| CN | 102566132 A | 7/2012 |
| CN | 102809843 A | 12/2012 |

(Continued)

OTHER PUBLICATIONS

Jackson R.W., "Considerations in the Use of Coplanar Waveguide for Millimeter-Wave Integrated Circuits", IEEE Transactions on Microwave Theory and Techniques MTT-34(12):1450-1456 (Dec. 31, 1986).

(Continued)

*Primary Examiner* — Thoi V Duong
(74) *Attorney, Agent, or Firm* — Scully, Scott, Murphy & Presser, P.C.

(57) ABSTRACT

A display panel and a display device are provided. The display panel includes a color-film substrate, an array substrate, a liquid-crystal layer, and a backlight module configured to provide collimated lights. The display panel includes multiple pixel units. The color-film substrate corresponding to each pixel unit has a first transmission region which transmits lights and a first non-transmission region which does not transmit lights. The array substrate corresponding to each pixel unit has a second transmission region which transmits lights and a second non-transmission region which does not transmit lights. An orthographic projection of the first non-transmission region on the array substrate completely covers the second transmission region. When the pixel unit works in a non-transmission mode, the liquid-crystal layer corresponding to the pixel unit is configured to transmit the collimated lights, and the first non-transmission region is configured to prevent the collimated lights from exiting from the color-film substrate.

20 Claims, 5 Drawing Sheets

(51) Int. Cl.
*G02F 1/137* (2006.01)
*G02F 1/1368* (2006.01)
*G02F 1/13363* (2006.01)
*G02F 1/13357* (2006.01)

(52) U.S. Cl.
CPC .. *G02F 1/133512* (2013.01); *G02F 1/133514* (2013.01); *G02F 1/133553* (2013.01); *G02F 1/133528* (2013.01); *G02F 1/133603* (2013.01); *G02F 1/133638* (2021.01); *G02F 2201/08* (2013.01); *G02F 2413/01* (2013.01)

(58) Field of Classification Search
CPC ......... G02F 1/133528; G02F 1/133553; G02F 1/1336; G02F 1/133603; G02F 1/133638; G02F 1/133607; G02F 1/1343; G02F 1/134309; G02F 1/13439; G02F 1/134372; G02F 1/1362; G02F 1/136218; G02F 1/1368; G02F 1/13756; G02F 2201/08; G02F 2413/01
See application file for complete search history.

(56) References Cited

FOREIGN PATENT DOCUMENTS

| | | |
|---|---|---|
| CN | 102914905 A | 2/2013 |
| CN | 103676316 A | 3/2014 |
| CN | 203909438 U | 10/2014 |
| CN | 104536633 A | 4/2015 |
| CN | 105301832 A | 2/2016 |
| CN | 109799655 A | 5/2019 |
| CN | 113741085 A | 12/2021 |
| CN | 113741087 A | 12/2021 |
| CN | 113985636 A | 1/2022 |
| JP | 2008-257168 A | 10/2008 |
| WO | 2017/081575 A1 | 5/2017 |

OTHER PUBLICATIONS

Jianzhong P. et al., "Large Screen Splicing Technology of TFT-LCD Color Filter", Technnology Innovation and Application, Issue 29 (Oct. 18, 2017).
Chinese Office Action dated Jun. 8, 2022 received in Chinese Application No. CN202210466766.3 (English-language translation).

* cited by examiner

RELATED ART

DISPLAY PANEL AND DISPLAY DEVICE

CROSS-REFERENCE TO RELATED APPLICATIONS

This application claims priority under 35 U.S.C. § 119(a) to Chinese Patent Application No. 202210466766.3, filed Apr. 29, 2022, the entire disclosure of which is incorporated herein by reference.

TECHNICAL FIELD

This application relates to the field of display panel, and particularly to a display panel and a display device.

BACKGROUND

At present, Liquid Crystal Displays (LCD) are mainstream displays widely used in various industries, and the LCD has advantages of thin shape, light weight, etc. An existing LCD panel controls an exit path of backlight through two polarizers with a liquid-crystal layer between the two polarizers, so that pixel units can have different brightness and display a colorful image through combination of a red light, a green light, and a blue light of different light intensities.

However, the existing LCD panel has a relatively large number of optical film layers and is relatively thick, and backlight bleeding (or leakage) still occurs when displaying a black picture, as a result, pure black cannot be displayed, so it is difficult to improve the contrast. In order to improve the contrast of the LCD, existing solutions mainly include: 1. the display panel has a laminated structure. However, the display panel with the laminated structure has disadvantages of a low light transmittance, thick, poor reliability, high cost, and a high requirement for backlight brightness; 2. the display panel is equipped with a Mini Light Emitting Diode (LED) backlight, but the cost of a Mini LED is relatively high, and if the Mini LED backlight cooperates with the display panel without fine partitioning, pure black display is still impossible.

SUMMARY

The disclosure provides a display panel. The display panel includes a color-film substrate, an array substrate, a liquid-crystal layer, and a backlight module. The array substrate is disposed opposite to the color-film substrate. The liquid-crystal layer is disposed between the color-film substrate and the array substrate. The backlight module is disposed at one side of the array substrate away from the liquid-crystal layer, and configured to provide collimated lights. The display panel includes multiple pixel units. For each of the multiple pixel units, the color-film substrate corresponding to the pixel unit has a first transmission region which transmits lights and a first non-transmission region which does not transmit lights, the array substrate corresponding to the pixel unit has a second transmission region which transmits lights and a second non-transmission region which does not transmit lights. An orthographic projection of the first non-transmission region on the array substrate completely covers the second transmission region. When the pixel unit works in a non-transmission mode, the liquid-crystal layer corresponding to the pixel unit is configured to transmit the collimated lights, and the first non-transmission region is configured to prevent collimated lights passing through the second transmission region and the liquid-crystal layer from exiting from the color-film substrate. When the pixel unit works in a transmission mode, the liquid-crystal layer corresponding to the pixel unit is configured to scatter the collimated lights, to make at least part of collimated lights passing through the second transmission region exit from the first transmission region after being scattered by the liquid-crystal layer.

The disclosure further provides a display device. The display device includes a drive circuit and a display panel. The display panel includes a color-film substrate, an array substrate, a liquid-crystal layer, and a backlight module. The array substrate is disposed opposite to the color-film substrate. The liquid-crystal layer is disposed between the color-film substrate and the array substrate. The backlight module is disposed at one side of the array substrate away from the liquid-crystal layer. The backlight module is configured to provide collimated lights. The backlight module includes a Mini Light Emitting Diode (LDE) light-source plate. The display panel includes multiple pixel units. For each of the multiple pixel units, the color-film substrate corresponding to the pixel unit has a first transmission region which transmits lights and a first non-transmission region which does not transmit lights, the array substrate corresponding to the pixel unit has a second transmission region which transmits lights and a second non-transmission region which does not transmit lights. An orthographic projection of the first non-transmission region on the array substrate completely covers the second transmission region. When the pixel unit works in a non-transmission mode, the liquid-crystal layer corresponding to the pixel unit is configured to transmit the collimated lights, and the first non-transmission region is configured to prevent collimated lights passing through the second transmission region and the liquid-crystal layer from exiting from the color-film substrate. When the pixel unit works in a transmission mode, the liquid-crystal layer corresponding to the pixel unit is configured to scatter the collimated lights, to make at least part of collimated lights passing through the second transmission region exit from the first transmission region after being scattered by the liquid-crystal layer. The drive circuit is configured to drive the display panel to display a picture.

The disclosure will be further depicted below with reference to specific implementations and accompanying drawings.

DETAILED DESCRIPTION

Hereinafter, technical solutions of implementations of the disclosure will be depicted in a clear and comprehensive manner with reference to accompanying drawings intended for these implementations. Apparently, implementations described below merely illustrate some implementations, rather than all implementations, of the disclosure. All other implementations obtained by those of ordinary skill in the art based on the implementations of the disclosure without creative efforts shall fall within the protection scope of the disclosure.

In description of the disclosure, it should be noted that, orientations or positional relationships indicated by the terms "upper", "lower", "left", "right", and the like are based on orientations or positional relationships illustrated in the accompanying drawings, and are only for convenience of describing the disclosure and simplifying the description, rather than indicating or implying that the referred device or element must have a specific orientation, be constructed and operated in a specific orientation, and therefore should not be construed as a limitation of the disclosure. In addition, the terms "first", "second", and the like are used for descriptive only and should not be construed to indicate or imply relative importance.

In view of this, the disclosure provides a display panel and a display device, which aims to solve a problem that an existing display panel has too many optical film layers and cannot display pure black.

The disclosure provides a display panel. The display panel includes a color-film substrate, an array substrate, a liquid-crystal layer, and a backlight module. The array substrate is disposed opposite to the color-film substrate. The liquid-crystal layer is disposed between the color-film substrate and the array substrate. The backlight module is disposed at one side of the array substrate away from the liquid-crystal layer, and configured to provide collimated lights. The display panel includes multiple pixel units. For each of the multiple pixel units, the color-film substrate corresponding to the pixel unit has a first transmission region which transmits lights and a first non-transmission region which does not transmit lights, the array substrate corresponding to the pixel unit has a second transmission region which transmits lights and a second non-transmission region which does not transmit lights. An orthographic projection of the first non-transmission region on the array substrate completely covers the second transmission region. When the pixel unit works in a non-transmission mode, the liquid-crystal layer corresponding to the pixel unit is configured to transmit the collimated lights, and the first non-transmission region is configured to prevent collimated lights passing through the second transmission region and the liquid-crystal layer from exiting from the color-film substrate. When the pixel unit works in a transmission mode, the liquid-crystal layer corresponding to the pixel unit is configured to scatter the collimated lights, to make at least part of collimated lights passing through the second transmission region exit from the first transmission region after being scattered by the liquid-crystal layer.

In the display panel of the disclosure, the color-film substrate has the first transmission region and the first non-transmission region, the array substrate has the second transmission region and the second non-transmission region, and the first non-transmission region completely covers the second transmission region, so that the pixel unit of the display panel does not leak lights in the non-transmission mode, which can not only improve the contrast, but also avoid introduction of an upper polarizer and a lower polarizer, as such, the structure of the display panel is simplified.

Optionally, the color-film substrate includes a first transparent substrate, a color-resistance layer, and a first reflective layer. The color-resistance layer is laminated on a side surface of the first transparent substrate close to the liquid-crystal layer. A color-resistance layer in a first transmission region corresponding to a single pixel unit has a filter color-resistance with a same color. The first reflective layer is disposed in the first non-transmission region and sandwiched between the color-resistance layer and the liquid-crystal layer.

Optionally, the color-film substrate includes a first transparent substrate, a color-resistance layer, and a first reflective layer. The color-resistance layer is laminated on a side surface of the first transparent substrate close to the liquid-crystal layer. A color-resistance layer in a first transmission region corresponding to a single pixel unit has a filter color-resistance with a same color, and a color-resistance layer in a first non-transmission region corresponding to each pixel unit has a black color-resistance. The first reflective layer is sandwiched between the color-resistance layer and the liquid-crystal layer. The first reflective layer is disposed in the first non-transmission region and faces the second transmission region.

Optionally, the first reflective layer completely covers a corresponding first non-transmission region. The array substrate includes a light-absorption region. The light-absorption region is located in the second non-transmission region and adjacent to the second transmission region. An orthographic projection of the light-absorption region on the color-film substrate overlaps with part of a first transmission region and a first non-transmission region which are adjacent. The light-absorption region is configured to absorb lights irradiating a surface of the light-absorption region.

Optionally, the first reflective layer has an area smaller than a corresponding first non-transmission region. A periphery of a black color-resistance corresponding to the first reflective layer is not covered by the first reflective layer. A black color-resistance on a periphery of the first reflective layer is configured to absorb lights irradiating a surface of the black color-resistance.

Optionally, the first reflective layer is made of a reflective conductive material. The color-film substrate further includes a first transparent electrode layer. The first transparent electrode layer is sandwiched between the color-resistance layer and the liquid-crystal layer and at least covers the first transmission region. The first transparent electrode layer is made of a transparent conductive material. The first transparent electrode layer forms a common electrode together with a corresponding first reflective layer.

Optionally, the array substrate includes a second transparent substrate and a composite lamination layer. The composite lamination layer is sandwiched between the second transparent substrate and the liquid-crystal layer and located in the second non-transmission region. The composite lamination layer at least includes a second reflective layer. The second reflective layer covers the second non-transmission region.

Optionally, the composite lamination layer further includes a third reflective layer and a switch-device layer. The third reflective layer is disposed opposite to the second reflective layer. The switch-device layer is sandwiched between the second reflective layer and the third reflective layer. A switch-device layer corresponding to each pixel unit includes a drive transistor.

Optionally, a composite lamination layer corresponding to each pixel unit includes a drive transistor. The composite lamination layer further includes a third reflective layer and an insulating layer. The third reflective layer is disposed opposite to the second reflective layer. A drain of the drive transistor is disposed in the second reflective layer, and a gate of the drive transistor is disposed in the third reflective layer. The insulating layer is sandwiched between the second reflective layer and the third reflective layer. An active layer and a source of the drive transistor are disposed in the insulating layer. The source is isolated from the drain through the insulating layer. The active layer is isolated from the gate through the insulating layer.

Optionally, the display panel further includes a retardation film and a polarizer. The retardation film is laminated on a side surface of the color-film substrate away from the array substrate. The retardation film has a quarter-wavelength phase delay compared to the liquid-crystal layer. The polarizer is laminated on a side surface of the retardation film away from the color-film substrate.

The disclosure further provides a display device. The display device includes a drive circuit and the above display panel. The backlight module of the display panel includes a Mini Light Emitting Diode (LDE) light-source plate. The drive circuit is configured to drive the display panel to display a picture.

Additional aspects and advantages of the disclosure will be illustrated in part from the following description, and the other part of the additional aspects and the advantages of the disclosure will become apparent from the following description, or may be learned by practice of the disclosure.

Figure 1:
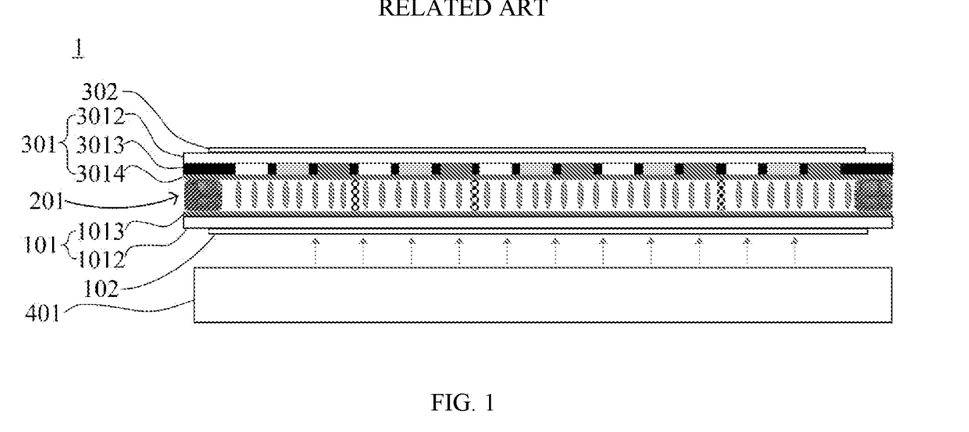
FIG. 1 is a schematic structural diagram illustrating an exemplary display panel.

Referring to FIG. 1, FIG. 1 is a schematic structural diagram illustrating an existing display panel 1. The display panel 1 includes a backlight module 401 configured to provide backlight, and includes a lower polarizer 102, an array substrate 101, a liquid-crystal layer 201, a color-film substrate 301, and an upper polarizer 302 which are laminated in sequence along an exit direction of the backlight. The color-film substrate 301 includes a common electrode 3014, a color-resistance layer 3013, and a first transparent substrate 3012 which are laminated in sequence along the exit direction of the backlight. The array substrate 101 includes a second transparent substrate 1012 and a pixel electrode 1013 which are laminated in sequence along the exit direction of the backlight. A transmission axis of the lower polarizer 102 is orthogonal to a transmission axis of the upper polarizer 302 (e.g., 0 degrees and 90 degrees, respectively).

During operation, the display panel 1 applies a common voltage to the common electrode 3014 and applies a data voltage to the pixel electrode 1013 to form an electric field in the liquid-crystal layer 201, to control a deflection angle of a liquid crystal molecule in the liquid-crystal layer 20, thereby controlling a display state of the display panel 1. Exemplarily, when an electric field is formed in the liquid-crystal layer 201, the backlight becomes linearly polarized lights (a polarization direction is parallel to the transmission axis of the lower polarizer 102) after passing through the lower polarizer 102, and a traveling direction of the linearly polarized lights is rotated under action of the liquid crystal molecule in the liquid-crystal layer 201, to make linearly polarized lights filtered by the color-resistance layer 3013 exit from the upper polarizer 302, so that the display panel 1 displays a color picture. When the electric field in the liquid-crystal layer 201 disappears, an arrangement state of the liquid crystal molecule in the liquid-crystal layer 201 changes, the linearly polarized lights keep traveling in an original direction, and the linearly polarized lights are absorbed by the upper polarizer 302 because a polarization direction of the linearly polarized lights is perpendicular to the transmission axis of the upper polarizer 302, so that the linearly polarized lights cannot pass through the upper polarizer 302, and therefore, the display panel 1 displays a black picture. However, in practical applications, when displaying a black picture, distortion and deformation of the first transparent substrate 3012 and the second transparent substrate 1012 will cause a change in delay of linearly polarized lights passing through the substrate. In addition, the color-resistance layer 3013 may also change a polarization state of the linearly polarized lights (e.g., depolarizing and changing the polarization direction), so that some of the linearly polarized lights with their polarization direction changed can exit from the upper polarizer 302, resulting in that the black displayed is not pure enough and the contrast is not high, which affects a user's visual experience.

Figure 2:
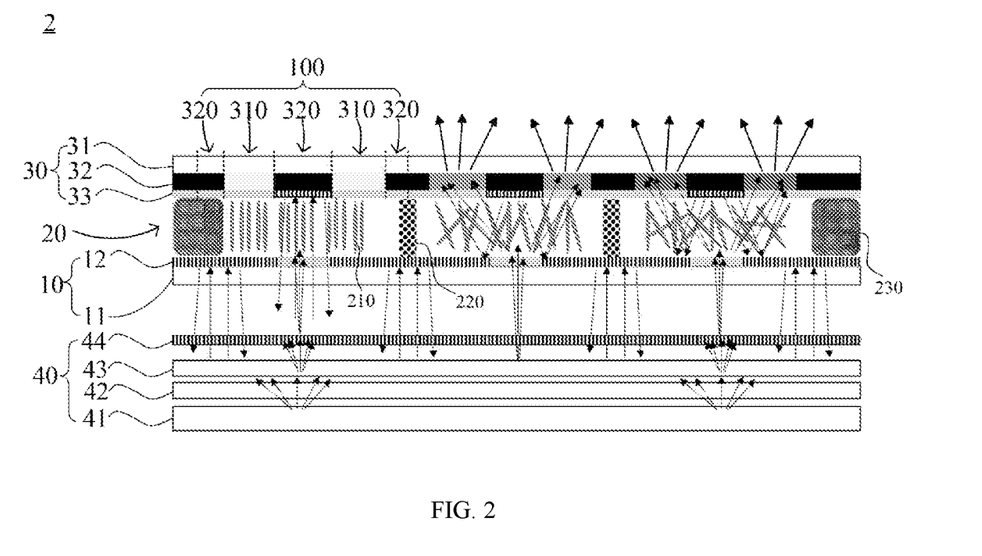
FIG. 2 is a schematic structural diagram illustrating a display panel including pixel units provided in implementations of the disclosure.

Referring to FIG. 2, in order to solve a problem of the low contrast of the existing display panel, the disclosure provides a display panel 2. The display panel 2 includes an array substrate 10, a liquid-crystal layer 20, a color-film substrate 30, and a backlight module 40. The array substrate 10 is disposed opposite to the color-film substrate 30. The liquid-crystal layer 20 is disposed between the color-film substrate 30 and the array substrate 10. The liquid-crystal layer 20 includes multiple liquid crystal molecules 210, multiple isolators 220, and a sealant 230. The isolator 220 functions as a support to maintain a certain distance between the array substrate 10 and the color-film substrate 30. The sealant 230 is configured to seal the liquid crystal molecules 210.

The backlight module 40 is disposed at one side of the array substrate 10 away from the liquid-crystal layer 20, and configured to provide collimated lights. In implementations of the disclosure, an angle between an exit direction of the collimated lights and a normal line of a plane where the array substrate 10 is located is less than or equal to a preset angle threshold θ, exemplarily, θ≤45°. Further, the backlight module 40 includes a reflection film 41, a diffusion component 42, a light-condensing component 43, a grating film 44, and a light source (not illustrated) for providing backlight which are laminated sequentially along a direction from the array substrate 10 to the color-film substrate 30. In an implementation, the light source is a Mini Light Emitting Diode (LED) light-source plate disposed at one side of the reflection film 41 away from the diffusion component 42. The reflection film 41 defines a light outlet corresponding to each Mini LED light source. Exemplarily, the grating film 44 defines multiple light channels arranged in an array. An extension direction of the light channels is perpendicular to a plane where the array substrate 10 is located. The light channels allow only some collimated lights to pass through, where an angle between an exit direction of such collimated lights and the normal line of the plane where the array substrate 10 is located is less than or equal to θ. As such, the collimated lights can be provided for the display panel 2.

The display panel 2 includes multiple pixel units 100. FIG. 2 exemplarily illustrates a structure of three pixel units 100. In the following, referring to FIG. 2 and FIG. 3, FIG. 3 is a first schematic structural diagram of the pixel unit 100 illustrated in FIG. 2.

Figure 3:
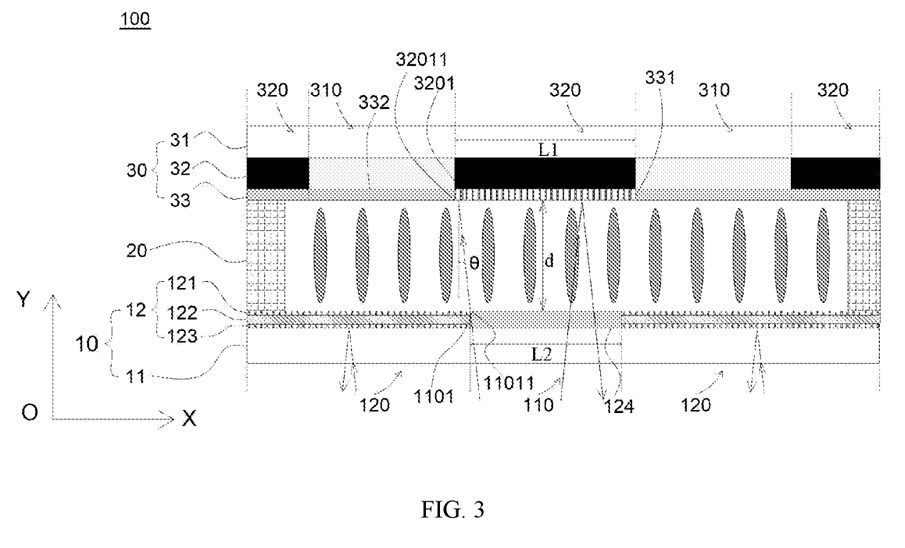
FIG. 3 is a first schematic structural diagram of the pixel unit illustrated in FIG. 2 including a composite lamination layer.
Figure 4:
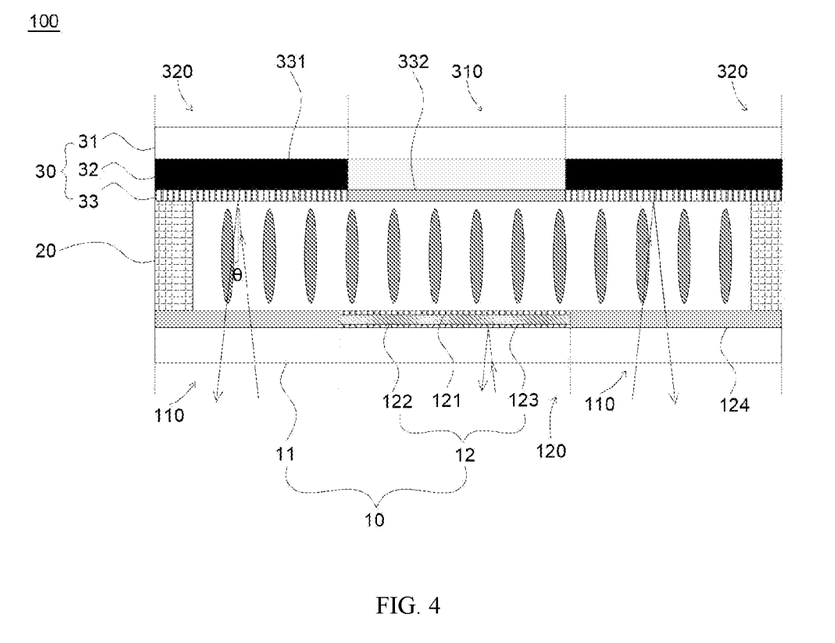
FIG. 4 is a second schematic structural diagram of the pixel unit illustrated in FIG. 2.

As illustrated in FIG. 3, for each pixel unit 100, the color-film substrate 30 corresponding to the pixel unit 100 has two first transmission regions 310 which transmit lights and three first non-transmission regions 320 which do not transmit lights, and the array substrate 10 corresponding to the pixel unit 100 has one second transmission region 110 which transmits lights and two second non-transmission regions 120 which do not transmit lights. An orthographic projection of the first non-transmission region 320 on the array substrate 10 completely covers the second transmission region 110. It should be noted that, the disclosure does not limit the number of transmission regions and the number of non-transmission regions. For example, in an implementation illustrated in FIG. 4, the color-film substrate 30 corresponding to the pixel unit 100 has one first transmission region 310 and two first non-transmission regions 320, and the array substrate 10 corresponding to the pixel unit 100 has two second transmission regions 110 which respectively face a corresponding first non-transmission region 320 and one second non-transmission region 120 which faces the first transmission region 310 and does not transmit lights. In other implementations, the color-film substrate 30 corresponding to each pixel unit 100 may have multiple first transmission regions 310 and multiple first non-transmission regions 320, where the multiple first transmission regions 310 and the multiple first non-transmission regions 320 are arranged alternately. The array substrate 10 corresponding to each pixel unit 100 may have multiple second transmission regions 110 and multiple second non-transmission regions 120, where the multiple second transmission regions 110 and the multiple second non-transmission regions 120 are arranged alternately.

When the pixel unit 100 works in a non-transmission mode, the liquid-crystal layer 20 corresponding to the pixel unit 100 is configured to transmit the collimated lights, and the first non-transmission region 320 is configured to prevent collimated lights passing through the second transmission region 110 and the liquid-crystal layer 20 from exiting from the color-film substrate 30. Specifically, as illustrated in FIG. 2, an electric field is applied to the liquid-crystal layer 20 corresponding to a left pixel unit 100, liquid crystal molecules 210 in the liquid-crystal layer 20 are arranged regularly, and a light-transmission axis of the liquid crystal molecules 210 is parallel to the normal line of the plane where the array substrate 10 is located. In this situation, the liquid-crystal layer 20 corresponding to the left pixel unit 100 is in a transparent state, and thus, the liquid crystal molecules 210 do not change a traveling direction of the collimated lights. The collimated lights pass through the second transmission region 110 and the liquid-crystal layer 20, and then are blocked by the first non-transmission region 320, so that these collimated lights cannot pass through the color-film substrate 30, and therefore, the pixel unit 100 can display black. Exemplarily, the shape of the first non-transmission region 320 is the same as that of the second transmission region 110 (e.g., a rectangle). As illustrated in FIG. 3, the first non-transmission region 320 has a first side surface 3201 connected with an adjacent first transmission region 310, and the first side surface 3201 has a bottom edge 32011 connected with the liquid-crystal layer 20. The second transmission region 110 has a second side surface 1101 which is connected with an adjacent second non-transmission region 120 and close to the first side surface 3201, and the second side surface 1101 has a top edge 11011 connected with the liquid-crystal layer. An angle between a vertical line segment (between the bottom edge 32011 of the first non-transmission region 320 and the top side 11011 of the second transmission region 110) and a normal line of a plane where the color-film substrate 30 is located is greater than or equal to the preset angle threshold θ. In other words, a width L1 of the first non-transmission region 320 in a first direction (an OX direction illustrated in FIG. 3) and a width L2 of the second transmission region 110 (opposite to the first non-transmission region 320) in the first direction satisfy the following relationship:

$$L1 \geq L2 + 2*d*\tan\theta$$

where d represents a distance between the array substrate 10 and the color-film substrate 30, and θ represents the preset angle threshold. As such, it can be ensured that the collimated lights passing through the second transmission region 110 and the liquid-crystal layer 20 can be completely blocked by the first non-transmission region 320, so that the pixel unit 100 can display pure black.

When the pixel unit 100 works in a transmission mode, the liquid-crystal layer 20 corresponding to the pixel unit 100 is configured to scatter the collimated lights, to make at least part of collimated lights passing through the second transmission region 110 exit from the first transmission region 310 after being scattered by the liquid-crystal layer 20. Specifically, as illustrated in FIG. 2, no electric field is applied to the liquid-crystal layer 20 corresponding to a middle pixel unit 100, and thus, liquid crystal molecules 210 in the liquid-crystal layer 20 are arranged irregularly. In this situation, the liquid-crystal layer 20 of the pixel unit 100 is in a turbid state. When collimated lights passing through the second transmission region 110 enter the turbid liquid-crystal layer 20, liquid crystal molecules 210 in the liquid-crystal layer 20 are configured to scatter the collimated lights, to make at least part of scattered lights pass through the first transmission region 310 of the pixel unit 100, so that the pixel unit 100 displays a corresponding color, for example, green. In another implementation, the pixel unit 100 may also work in the transmission mode when an electric field is applied to the liquid-crystal layer 20 of the pixel unit 100, or work in the non-transmission mode when no electric field is applied, which is not limited herein.

In the display panel 2 of the disclosure, the color-film substrate 30 has the first transmission region 310 and the first non-transmission region 320, the array substrate 10 has the second transmission region 110 and the second non-transmission region 120, and the first non-transmission region 320 completely covers the second transmission region 110, so that the pixel unit 100 of the display panel 2 does not leak lights in the non-transmission mode, which can not only improve the contrast, but also avoid introduction of an upper polarizer and a lower polarizer, as such, the structure of the display panel 2 is simplified.

Referring to FIG. 3 again, the color-film substrate 30 includes a first transparent substrate 31, a color-resistance layer 32, and a first reflective layer 331. The color-resistance layer 32 is laminated on a side surface of the first transparent substrate 31 close to the liquid-crystal layer 20. A color-resistance layer 32 in a first transmission region 310 corresponding to a single pixel unit 100 has a filter color-resistance with a same color, for example, one of a red filter color-resistance, a green filter color-resistance, or a blue filter color-resistance. A color-resistance layer 32 in a first non-transmission region 320 corresponding to the pixel unit 100 has a black color-resistance. The black color-resistance may be made of black resin. Exemplarily, in an implementation illustrated in FIG. 2, the left pixel unit 100 has a red filter color-resistance, the middle pixel unit 100 has a green filter color-resistance, and the right pixel unit 100 has a blue filter color-resistance. The three pixel units 100 form a pixel group, and the pixel group can display various colors by controlling working modes of the three pixel units 100 respectively. For example, in FIG. 2, the red pixel unit 100 works in the non-transmission mode, and the blue pixel unit 100 and the green pixel unit 100 each work in the transmission mode, so that the pixel group displays cyan.

Specifically, the first reflective layer 331 is disposed in the first non-transmission region 320 and sandwiched between the color-resistance layer 32 and the liquid-crystal layer 20. In this implementation, the first reflective layer 331 is only disposed in the first non-transmission region 320 facing the second transmission region 110, and the first reflective layer 331 completely covers the first non-transmission region 320. In other implementations, the first reflective layer 331 may also be disposed in each first non-transmission region 320. The first reflective layer 331 is configured to reflect lights irradiating a surface of the first reflective layer 331 back, and the reflection film 41 in the backlight module 40 is configured to reuse reflected lights upon receiving the reflected lights (that is, the reflection film 41 reflects the reflected lights to the array substrate 10 again). As such, a utilization rate of the light source can be improved and more energy can be saved. Exemplarily, as illustrated in FIG. 3, when the pixel unit 100 works in the transmission mode, the first reflective layer 331 can reflect collimated lights sequentially passing through the second transmission region 110 and the liquid-crystal layer 20, so that the reflected collimated lights passes through the liquid-crystal layer 20 and the second transmission region 110 in turn and then returns to the backlight module 40.

Further, the first reflective layer 331 is made of a reflective conductive material (e.g., at least one of silver, chromium, magnesium, or aluminum). The first reflective layer 331 constitutes part of a common electrode 33, and the common electrode is used to receive a common voltage. In this implementation, the color-film substrate 30 further includes a first transparent electrode layer 332. The first transparent electrode layer 332 is sandwiched between the color-resistance layer 32 and the liquid-crystal layer 20 and at least covers the first transmission region 310. The first transparent electrode layer 332 is made of a transparent conductive material (e.g., Indium-Tin-Oxide (ITO)), and forms the common electrode 33 together with a corresponding first reflective layer 331. As such, the common electrode 33 can cover all liquid crystal molecules 210, so that a range of a controllable electric field in the liquid-crystal layer 20 is larger. In other implementations, no first transparent electrode layer 332 is provided in the first transmission region 310, which can not only save materials, but also avoid interference of the ITO to exit lights when the pixel unit 100 works in the transmission mode, and increase display saturation.

Further, the array substrate 10 includes a second transparent substrate 11 and a composite lamination layer 12. The composite lamination layer 12 is sandwiched between the second transparent substrate 11 and the liquid-crystal layer 20, and located in the second non-transmission region 120. The composite lamination layer 12 includes a second reflective layer 121, a switch-device layer 122, and a third reflective layer 123. The second reflective layer 121 is laminated on the liquid-crystal layer 20 and covers the second non-transmission region 120. The third reflective layer 123 is disposed opposite to the second reflective layer 121. The switch-device layer 122 is sandwiched between the second reflective layer 121 and the third reflective layer 123. In implementations of the disclosure, a switch-device layer 122 corresponding to each pixel unit 100 includes a drive transistor 200. The second reflective layer 121 is configured to reflect lights irradiating a surface of the second reflective layer 121. When the pixel unit 100 works in the transmission mode, the second reflective layer 121 can reflect lights scattered by the liquid-crystal layer 20 to a surface of the second reflective layer 121, so as to exit from a first transmission region 310 facing the second reflective layer 121. As such, a higher contrast can be achieved. The third reflective layer 123 is configured to reflect lights irradiating a surface of the third reflective layer 123 back to the backlight module 40 for reuse. As such, a utilization rate of the light source can be further improved. In addition, since the second reflective layer 121 and the third reflective layer 123 can shield the switch-device layer 122, interference of lights to working characteristics of the drive transistor 200 can be prevented, thereby improving a reliability of the drive transistor 200.

Figure 5:
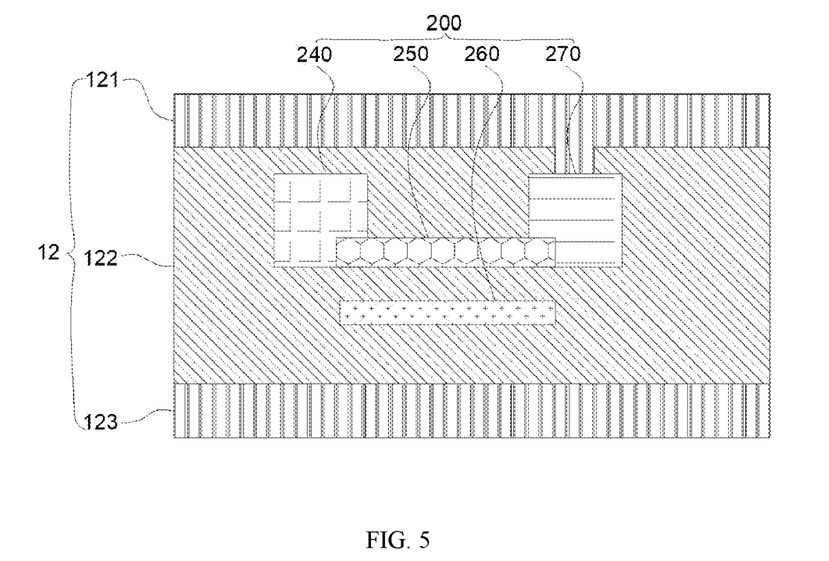
FIG. 5 is a partially enlarged schematic diagram illustrating a structure of the composite lamination layer illustrated in FIG. 3.

Further, referring to FIG. 5, the second reflective layer 121 is made of a reflective conductive material, and the second reflective layer 121 constitutes a pixel electrode. The drive transistor 200 includes a source 240, an active layer 250, a gate 260, and a drain 270. The source 240 is isolated from the drain 270 through an insulating layer, and the active layer 250 is isolated from the gate 260 through the insulating layer. The source 240 and the drain 270 each are connected with the active layer 250. The gate 260 is configured to receive a scan signal, the source 240 is configured to receive a data voltage, and the drain 270 is electrically connected to a pixel electrode through a via hole. The drive transistor 200 is switched on upon receiving the scan signal, receives the data voltage, and outputs the data voltage to a corresponding pixel electrode. The pixel unit 100 receives the common voltage through the common electrode and receives the data voltage through the pixel electrode, to form an electric field in a liquid-crystal layer 20 corresponding to the pixel unit 100, thereby controlling deflection of liquid crystal molecules 210 in the liquid-crystal layer 20.

In implementations of the disclosure, the array substrate 10 further includes a second transparent electrode layer 124. The second transparent electrode layer 124 is sandwiched between the second transparent substrate 11 and the liquid-crystal layer 20 and covers the second transmission region 110. The second transparent electrode layer 124 is made of a transparent conductive material (e.g., ITO), and forms a pixel electrode together with a corresponding second reflective layer 121. As such, the pixel electrode can cover all liquid crystal molecules 210, so that a range of a controllable electric field in the liquid-crystal layer 20 is larger. In other implementations, no second transparent electrode layer 124 is provided in the second transmission region 110, which can not only save materials, but also avoid interference of the ITO to exit lights when the pixel unit 100 works in the transmission mode, and increase display saturation.

In another implementation, only one reflective layer is disposed in the composite lamination layer 12. For example, only the second reflective layer 121 is provided, and the switch-device layer 122 is laminated on the second transparent substrate 11; alternatively, only the third reflective layer 123 is provided, and the switch-device layer 122 is laminated on the liquid-crystal layer 20. As such, materials can be saved and one manufacturing process can be reduced.

Figure 6:
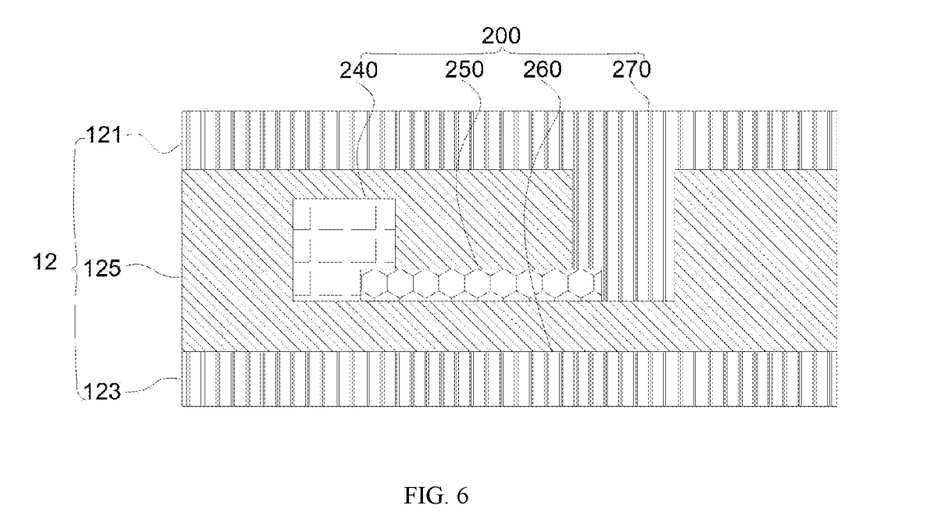
FIG. 6 is a partially enlarged schematic diagram illustrating another structure of the composite lamination layer illustrated in FIG. 3.

In yet another implementation, as illustrated in FIG. 6, the composite lamination layer 12 corresponding to each pixel unit 100 includes a drive transistor 200. Specifically, the composite lamination layer 12 includes a second reflective layer 121, an insulating layer 125, and a third reflective layer 123. The insulating layer 125 is sandwiched between the second reflective layer 121 and the third reflective layer 123. The drive transistor 200 includes a source 240, an active layer 250, a gate 260, and a drain 270. The active layer 250 and the source 240 of the drive transistor 200 are disposed in the insulating layer 125. The source 240 is isolated from the drain 270 through the insulating layer 125, and the active layer 250 is isolated from the gate 260 through the insulating layer 125. The drain 270 is connected with the active layer 250 through a via hole. The drain 270 of the drive transistor is disposed in the second reflective layer 121, and the gate 260 of the drive transistor is disposed in the third reflective layer 123. Further, a scan line (not illustrated) for transmitting the scan signal in the array substrate 10 may also be disposed in the third reflective layer 123. It can be understood that, the drain 270 of the drive transistor 200 covers the second non-transmission region 120 as a main reflection part of the second reflective layer 121, and the gate 260 of the drive transistor 200 covers the second non-transmission region 120 as a main reflection part of the third reflective layer 123, which can reduce a two-layer layered structure on the one hand, thereby simplifying a manufacturing process and saving materials. On the other hand, cross-sectional areas of the drain 270 and the gate 260 can be increased, thereby reducing an internal resistance of the drive transistor 200 and reducing energy consumption.

Figure 7:
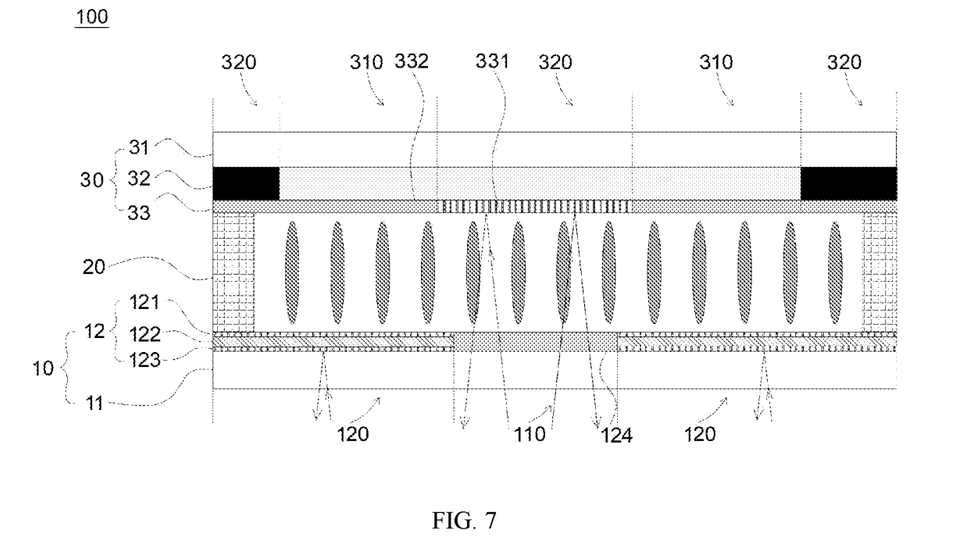
FIG. 7 is a third schematic structural diagram of the pixel unit illustrated in FIG. 2.

Referring to FIG. 7, FIG. 7 is a third schematic structural diagram of the pixel unit 100 of the display panel 2 illustrated in FIG. 2. Compared to the implementations illustrated in FIG. 3, a difference lies in that: in each pixel unit 100, part of the color-resistance layer 32 disposed in the first transmission region 310 and covered by the first reflective layer 331 has a filter color-resistance with a same color. Since the filter color-resistance in a single pixel unit 100 is a whole piece of color-resistance with a relatively large area, the difficulty of manufacturing the color-resistance layer 32 can be reduced.

Figure 8:
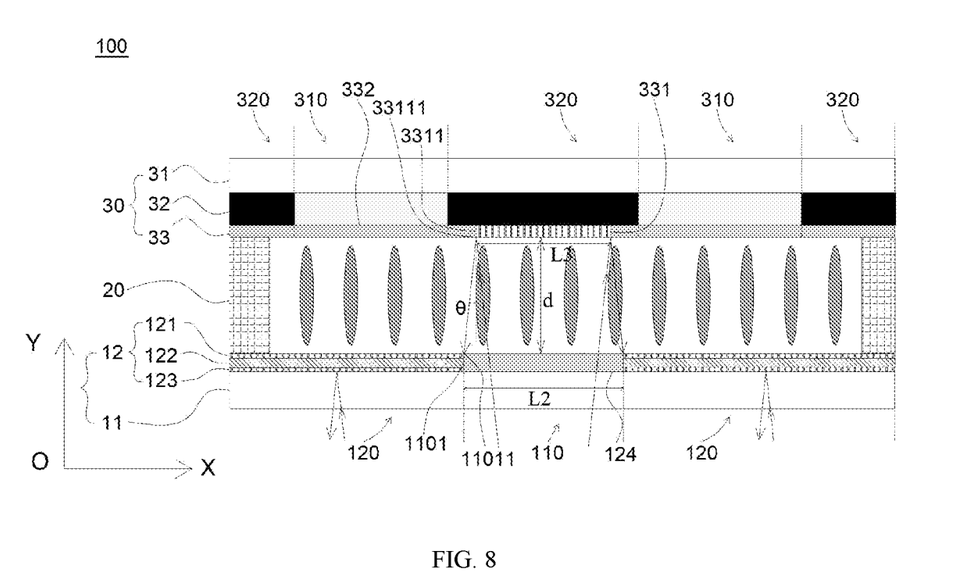
FIG. 8 is a fourth schematic structural diagram of the pixel unit illustrated in FIG. 2.

Referring to FIG. 8, FIG. 8 is a fourth schematic structural diagram of the pixel unit 100 of the display panel 2 illustrated in FIG. 2. Compared to the implementations illustrated in FIG. 3, a difference lies in that: in each pixel unit 100, the first reflective layer 331 has an area smaller than a corresponding first non-transmission region 320, and no first reflective layer 331 covers on a periphery of a black color-resistance corresponding to the first reflective layer 331. Exemplarily, the shape of the first reflective layer 331 is the same as that of the second transmission region 110 (e.g., a rectangle). The first reflective layer 331 has a third side surface 3311 which is connected with an adjacent first transparent electrode layer 332 and close to the second side surface 1101 of the second transmission region, and the third side surface 3311 has a bottom edge 33111 connected with the liquid-crystal layer 20. An angle between a vertical line segment (between the top edge 11011 of the second transmission region 110 and the bottom edge 33111 of the first reflective layer 331) and the normal line of the plane where the color-film substrate 30 is located is greater than or equal to the preset angle threshold θ. In other words, a width L3 of the first reflective layer 331 in the first direction (the OX direction illustrated in FIG. 3) and the width L2 of the second transmission region 110 (opposite to the first reflective layer 331) in the first direction satisfy the following relationship:

$L3 \leq L2 - 2*d*\tan\theta$

Based on the above, when the pixel unit 100 works in the non-transmission mode, part of the collimated lights sequentially passing through the second transmission region 110 and the liquid-crystal layer 20 are directly absorbed by a black color-resistance on a periphery of the first reflective layer 331, and the rest of these collimated lights are all returned to the backlight module 40 after passing through the second transmission region 110. As such, collimated lights reflected by the first reflective layer 331 can be prevented from exiting from the first transmission region 310 after being reflected again by the second reflective layer 121, thereby further improving the contrast. It can be understood that, the smaller an area of the first reflective layer 331 is, the less lights returns to the backlight module 40 after passing through the second transmission region 110, and the lower a utilization rate of the light source is. In an implementation, no first reflective layer 331 is provided in the first non-transmission region 320, that is, the area of the first reflective layer 331 is zero, which is not limited herein.

Figure 9:
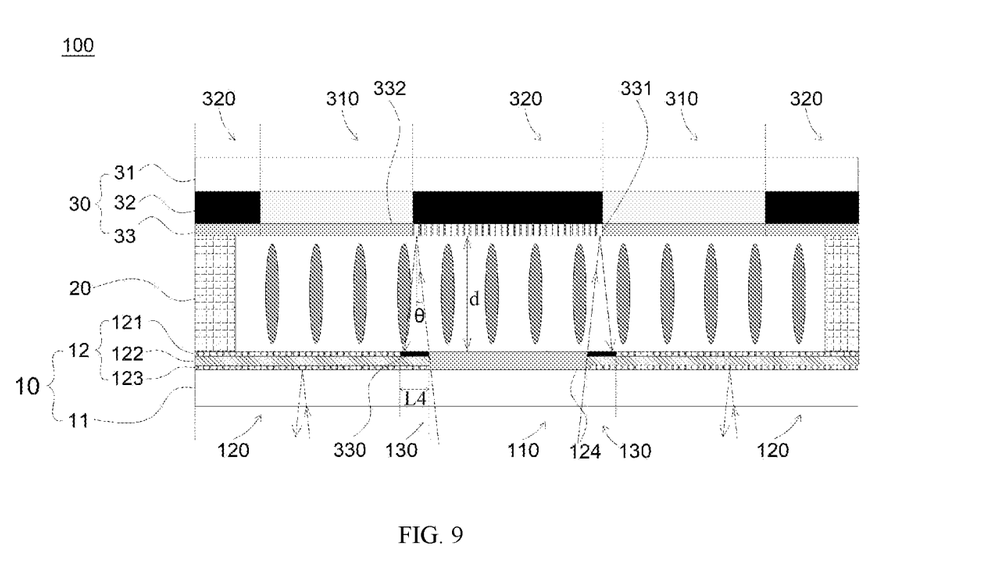
FIG. 9 is a fifth schematic structural diagram of the pixel unit illustrated in FIG. 2.

Referring to FIG. 9, FIG. 9 is a fifth schematic structural diagram of the pixel unit 100 of the display panel 2 illustrated in FIG. 2. Compared to the implementations illustrated in FIG. 3, a difference lies in that: in each pixel unit 100, the array substrate 10 corresponding to the pixel unit 100 further includes a light-absorption region 330 located in the second non-transmission region 120 and adjacent to the second transmission region 110. An orthographic projection of the light-absorption region 330 on the color-film substrate 30 overlaps with part of a first transmission region 310 and a first non-transmission region 320 which are adjacent. The light-absorption region 330 of the pixel unit 100 is configured to absorb lights irradiating a surface of the light-absorption region 330. Exemplarily, a width of each light-absorption region 330 (i.e., a distance between a side of the light-absorption region 330 close to a second transmission region 110 adjacent to the light-absorption region 330 and a side of the light-absorption region 330 away from the second transmission region 110 adjacent to the light-absorption region 330) is greater than or equal to a preset width threshold L4, where $L4 = 2*d*\tan\theta$. When the pixel unit 100 works in the non-transmission mode, the first reflective layer 331 is configured to reflect collimated lights sequentially passing through the second transmission region 110 and the liquid-crystal layer 20 to obtain reflected lights. Part of the reflected lights pass through the second transmission region 110 and then return to the backlight module 40, and the rest of the reflected lights are absorbed by the light-absorption region 330. As such, the reflected lights can be prevented from exiting from the first transmission region 310 after being reflected again by the second reflective layer 121, thereby further improving the contrast.

Figure 10:
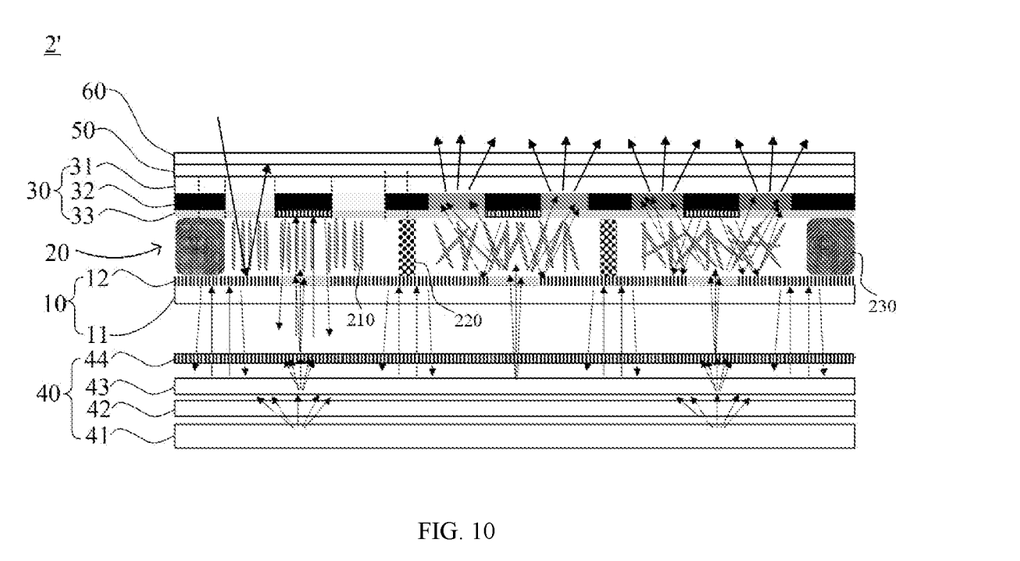
FIG. 10 is a schematic structural diagram illustrating a display panel provided in other implementations of the disclosure.

Referring to FIG. 10, FIG. 10 is a schematic structural diagram illustrating a display panel 2' provided in other implementations of the disclosure. Compared to the display panel 2 illustrated in FIG. 2, a difference lies in that: the display panel 2' further includes a retardation film 50 and a polarizer 60. The retardation film 50 is laminated on a side surface of the color-film substrate 30 away from the array substrate 10. The retardation film 50 has a quarter-wavelength phase delay compared to the liquid-crystal layer 20. The polarizer 60 is laminated on a side surface of the retardation film 50 away from the color-film substrate 30.

An absorption axis of the polarizer 60 for example is along a vertical direction, when external ambient lights pass through the polarizer 60, polarized lights of the vertical direction are absorbed by the polarizer 60 while polarized lights of a horizontal direction (i.e., half of the external ambient lights) remain. The polarized lights of the horizontal direction become left-handed circularly polarized lights after passing through the retardation film 50. The left-handed circularly polarized lights become right-handed circularly polarized lights after being reflected by the second reflective layer 121 to rotate 180 degrees. The right-handed circularly polarized lights become vertically polarized lights after passing through the retardation film 50 again. The vertically polarized lights are absorbed by the polarizer 60. Therefore, the retardation film 50 and the polarizer 60 can absorb reflected lights obtained by reflection of the external ambient lights by the second reflective layer 121, so that the display panel 2' can display more pure black, thereby further improving the contrast.

Based on the same inventive concept, the disclosure further provides a display device. The display device includes a drive circuit and the above display panel. The drive circuit is configured to drive the display panel to display a picture.

While the implementations of the disclosure have been illustrated and depicted above, it will be understood by those of ordinary skill in the art that various changes, modifications, substitutions, and alterations can be made to these implementations without departing from the principles and spirits of the disclosure. Therefore, the scope of the disclosure is defined by the appended claims and equivalents of the appended claims.

What is claimed is:

1. A display panel, comprising
a color-film substrate;
an array substrate disposed opposite to the color-film substrate;
a liquid-crystal layer disposed between the color-film substrate and the array substrate; and
a backlight module disposed at one side of the array substrate away from the liquid-crystal layer and configured to provide collimated lights;
the display panel comprising a plurality of pixel units;
for each of the plurality of pixel units, the color-film substrate corresponding to the pixel unit having a first transmission region which transmits lights and a first non-transmission region which does not transmit lights, the array substrate corresponding to the pixel unit having a second transmission region which transmits lights and a second non-transmission region which does not transmit lights, and an orthographic projection of the first non-transmission region on the array substrate completely covering the second transmission region;
the color-film substrate comprising a first reflective layer disposed in the first non-transmission region, the first reflective layer being made of a reflective conductive material, and the first reflective layer constituting part of a common electrode;
when the pixel unit works in a non-transmission mode, the liquid-crystal layer corresponding to the pixel unit being configured to transmit the collimated lights, and the first non-transmission region being configured to prevent collimated lights passing through the second transmission region and the liquid-crystal layer from exiting from the color-film substrate; and
when the pixel unit works in a transmission mode, the liquid-crystal layer corresponding to the pixel unit being configured to scatter the collimated lights, to make at least part of collimated lights passing through the second transmission region exit from the first transmission region after being scattered by the liquid-crystal layer.

2. The display panel of claim 1, wherein the color-film substrate further comprises:
a first transparent substrate; and
a color-resistance layer laminated on a side surface of the first transparent substrate close to the liquid-crystal layer, wherein the color-resistance layer in the first transmission region corresponding to a single pixel unit has a filter color-resistance with a same color;
the first reflective layer being sandwiched between the color-resistance layer and the liquid-crystal layer.

3. The display panel of claim 2, wherein
the first reflective layer completely covers a corresponding first non-transmission region; and
the array substrate further comprises a light-absorption region, wherein the light-absorption region is located in the second non-transmission region and adjacent to the second transmission region, and an orthographic projection of the light-absorption region on the color-film substrate overlaps with part of the first transmission region and the first non-transmission region which are adjacent, wherein
the light-absorption region is configured to absorb lights irradiating a surface of the light-absorption region.

4. The display panel of claim 2, wherein
the color-film substrate further comprises a first transparent electrode layer, wherein the first transparent electrode layer is sandwiched between the color-resistance layer and the liquid-crystal layer and at least covers the first transmission region, the first transparent electrode layer is made of a transparent conductive material, and the first transparent electrode layer forms a common electrode together with a corresponding first reflective layer.

5. The display panel of claim 1, wherein the color-film substrate further comprises:
a first transparent substrate; and
a color-resistance layer laminated on a side surface of the first transparent substrate close to the liquid-crystal layer, wherein the color-resistance layer in the first transmission region corresponding to a single pixel unit has a filter color-resistance with a same color, and the color-resistance layer in the first non-transmission region corresponding to each pixel unit has a black color-resistance;
the first reflective layer being sandwiched between the color-resistance layer and the liquid-crystal layer, and facing the second transmission region.

6. The display panel of claim 5, wherein
the first reflective layer has an area smaller than a corresponding first non-transmission region, and a periphery of the black color-resistance corresponding to the first reflective layer is not covered by the first reflective layer; and
the black color-resistance on a periphery of the first reflective layer is configured to absorb lights irradiating a surface of the black color-resistance.

7. The display panel of claim 1, wherein the array substrate comprises:
a second transparent substrate; and
a composite lamination layer sandwiched between the second transparent substrate and the liquid-crystal layer and located in the second non-transmission region, wherein the composite lamination layer at least comprises a second reflective layer, and the second reflective layer covers the second non-transmission region.

8. The display panel of claim 7, wherein the composite lamination layer further comprises:
a third reflective layer disposed opposite to the second reflective layer; and
a switch-device layer sandwiched between the second reflective layer and the third reflective layer, wherein a switch-device layer corresponding to each pixel unit comprises a drive transistor.

9. The display panel of claim 7, wherein
the composite lamination layer corresponding to each pixel unit comprises a drive transistor; and the composite lamination layer further comprises:
a third reflective layer disposed opposite to the second reflective layer, wherein a drain of the drive transistor is disposed in the second reflective layer, and a gate of the drive transistor is disposed in the third reflective layer; and
an insulating layer sandwiched between the second reflective layer and the third reflective layer, wherein an active layer and a source of the drive transistor are disposed in the insulating layer, the source is isolated from the drain through the insulating layer, and the active layer is isolated from the gate through the insulating layer.

10. The display panel of claim 1, further comprising:
a retardation film laminated on a side surface of the color-film substrate away from the array substrate, wherein the retardation film has a quarter-wavelength phase delay compared to the liquid-crystal layer; and
a Polarizer laminated on a side surface of the retardation film away from the color-film substrate.

11. A display device, comprising:
a display panel comprising:
a color-film substrate;
an array substrate disposed opposite to the color-film substrate;
a liquid-crystal layer disposed between the color-film substrate and the array substrate; and
a backlight module disposed at one side of the array substrate away from the liquid-crystal layer, the backlight module being configured to provide collimated lights and comprising a Mini Light Emitting Diode (LDE) light-source plate;
the display panel comprising a plurality of pixel units;
for each of the plurality of pixel units, the color-film substrate corresponding to the pixel unit having a first transmission region which transmits lights and a first non-transmission region which does not transmit lights, the array substrate corresponding to the pixel unit having a second transmission region which transmits lights and a second non-transmission region which does not transmit lights, and an orthographic projection of the first non-transmission region on the array substrate completely covering the second transmission region;
the color-film substrate comprising a first reflective layer disposed in the first non-transmission region, the first reflective layer being made of a reflective conductive material, and the first reflective layer constituting part of a common electrode;
when the pixel unit works in a non-transmission mode, the liquid-crystal layer corresponding to the pixel unit being configured to transmit the collimated lights, and the first non-transmission region being configured to prevent collimated lights passing through the second transmission region and the liquid-crystal layer from exiting from the color-film substrate; and
when the pixel unit works in a transmission mode, the liquid-crystal layer corresponding to the pixel unit being configured to scatter the collimated lights, to make at least part of collimated lights passing through the second transmission region exit from the first transmission region after being scattered by the liquid-crystal layer; and
a drive circuit, configured to drive the display panel to display a picture.

12. The display device of claim 11, wherein the color-film substrate further comprises:
a first transparent substrate; and
a color-resistance layer laminated on a side surface of the first transparent substrate close to the liquid-crystal layer, wherein the color-resistance layer in the first transmission region corresponding to a single pixel unit has a filter color-resistance with a same color;
the first reflective layer being sandwiched between the color-resistance layer and the liquid-crystal layer.

13. The display device of claim 12, wherein
the first reflective layer completely covers a corresponding first non-transmission region; and
the array substrate further comprises a light-absorption region, wherein the light-absorption region is located in the second non-transmission region and adjacent to the second transmission region, and an orthographic projection of the light-absorption region on the color-film substrate overlaps with part of the first transmission region and the first non-transmission region which are adjacent, wherein
the light-absorption region is configured to absorb lights irradiating a surface of the light-absorption region.

14. The display device of claim 12, wherein
the color-film substrate further comprises a first transparent electrode layer, wherein the first transparent electrode layer is sandwiched between the color-resistance layer and the liquid-crystal layer and at least covers the first transmission region, the first transparent electrode layer is made of a transparent conductive material, and the first transparent electrode layer forms a common electrode together with a corresponding first reflective layer.

15. The display device of claim 11, wherein the color-film substrate further comprises:
a first transparent substrate; and
a color-resistance layer laminated on a side surface of the first transparent substrate close to the liquid-crystal layer, wherein the color-resistance layer in the first transmission region corresponding to a single pixel unit has a filter color-resistance with a same color, and the color-resistance layer in the first non-transmission region corresponding to each pixel unit has a black color-resistance;
the first reflective layer being sandwiched between the color-resistance layer and the liquid-crystal layer, and facing the second transmission region.

16. The display device of claim 15, wherein
the first reflective layer has an area smaller than a corresponding first non-transmission region, and a periphery of the black color-resistance corresponding to the first reflective layer is not covered by the first reflective layer; and the black color-resistance on a periphery of the first reflective layer is configured to absorb lights irradiating a surface of the black color-resistance.

17. The display device of claim 11, wherein the array substrate comprises:
 a second transparent substrate; and
 a composite lamination layer sandwiched between the second transparent substrate and the liquid-crystal layer and located in the second non-transmission region, wherein the composite lamination layer at least comprises a second reflective layer, and the second reflective layer covers the second non-transmission region.

18. The display device of claim 17, wherein the composite lamination layer further comprises:
 a third reflective layer disposed opposite to the second reflective layer; and
 a switch-device layer sandwiched between the second reflective layer and the third reflective layer, wherein a switch-device layer corresponding to each pixel unit comprises a drive transistor.

19. The display device of claim 17, wherein a composite lamination layer corresponding to each pixel unit comprises a drive transistor; and
the composite lamination layer further comprises:
 a third reflective layer disposed opposite to the second reflective layer, wherein a drain of the drive transistor is disposed in the second reflective layer, and a gate of the drive transistor is disposed in the third reflective layer; and
 an insulating layer sandwiched between the second reflective layer and the third reflective layer, wherein an active layer and a source of the drive transistor are disposed in the insulating layer, the source is isolated from the drain through the insulating layer, and the active layer is isolated from the gate through the insulating layer.

20. The display device of claim 11, wherein the display panel further comprises:
 a retardation film laminated on a side surface of the color-film substrate away from the array substrate, wherein the retardation film has a quarter-wavelength phase delay compared to the liquid-crystal layer; and
 a polarizer laminated on a side surface of the retardation film away from the color-film substrate.

\* \* \* \* \*